US008121147B2

(12) United States Patent  (10) Patent No.: US 8,121,147 B2
Kim et al.  (45) Date of Patent: Feb. 21, 2012

(54) CONTEXT-SENSITIVE MULTIMEDIA MESSAGE SERVICE RESPONSE

(75) Inventors: Ken Kim, Kanata (CA); Jiwei Wang, Kanata (CA); Vincent Kadar, Kanata (CA)

(73) Assignee: Airwide Solutions, Inc., Kanata, Ontario (CA)

( * ) Notice: Subject to any disclaimer, the term of this patent is extended or adjusted under 35 U.S.C. 154(b) by 1070 days.

(21) Appl. No.: 11/234,648

(22) Filed: Sep. 23, 2005

(65) Prior Publication Data

US 2007/0070979 A1  Mar. 29, 2007

(51) Int. Cl.
*H04J 3/16* (2006.01)
*H04L 12/66* (2006.01)

(52) U.S. Cl. ........ 370/466; 370/401; 370/252; 370/352; 455/466; 455/428; 455/404; 705/8

(58) Field of Classification Search ................. 370/465, 370/466, 401, 252, 352, 338, 428, 490, 216; 455/466, 428, 404; 705/8
See application file for complete search history.

(56) References Cited

U.S. PATENT DOCUMENTS

| 6,085,201 | A | 7/2000 | Tso |
| 2002/0072347 | A1 | 6/2002 | Dunko et al. |
| 2003/0073450 | A1 | 4/2003 | Laumen et al. |
| 2003/0135653 | A1 | 7/2003 | Marovich |
| 2003/0193951 | A1* | 10/2003 | Fenton et al. ................. 370/392 |
| 2003/0204573 | A1* | 10/2003 | Beck et al. ..................... 709/218 |
| 2004/0120250 | A1* | 6/2004 | Langevin et al. ............. 370/216 |
| 2004/0158486 | A1* | 8/2004 | Nudd et al. ....................... 705/8 |
| 2005/0198525 | A1* | 9/2005 | Trossen et al. ................ 713/200 |
| 2006/0209867 | A1* | 9/2006 | Schmidt et al. ............... 370/428 |

FOREIGN PATENT DOCUMENTS

| WO | 02/078362 A1 | 10/2002 |
| WO | 2005/060281 A1 | 6/2005 |

OTHER PUBLICATIONS

Bulander et al. "Enabling Personalized and Context Sensitive Mobile Advertising While Guaranteeing Data Protection" in (Ibrahim Kushchu, M. halid Kuscu): Proceedings of the Euro-mGOV 2005, Sussex University, Brighton, UK. Mobile Government International LLC, Presented at the First Euro Conference on Mobile Government, Jul. 10-12, 2005, pp. 445-454.*

(Continued)

*Primary Examiner* — Aung S Moe
*Assistant Examiner* — Jamal Javaid
(74) *Attorney, Agent, or Firm* — Shalom Wertsberger; Saltamar Innovations (57) ABSTRACT

An apparatus and a method for context-sensitive multimedia message service (MMS) response. The provision of a response to a MMS UA originated MMS message (e.g. requesting to send a multimedia message (MM)) that is context-sensitive allows the network operator/service provider to provide value-added and potentially revenue generating content in the response. The content of the response can be context-sensitive based on one or more context parameters. The context parameters can be based on any of the information elements in the MMS UA originated MMS message, on fields in an associated MM, inputs provided by other external systems (e.g., accounting, presence and location information) and combinations thereof.

24 Claims, 5 Drawing Sheets

OTHER PUBLICATIONS

Global System for Mobile Communications; *Digital Cellular Telecommunications System (Phase 2+); Universal Mobile Telecommunications System (UMTS); Multimedia Messaging Service (MMS); Functional Descriptions; Stage 2 (3GPP TS 23.140 version 6.10.0 Release 6)*; ETSI TS 123 140 v6.10.0 (Jun. 2005) F-06921 Sophia Antipolis Cedex - France; http://www.etsi.org.

3RD Generation Partnership Project 2 "3GPP2"; *Multimedia Messaging Service; Stage 2 Functional Description; TSG-X (PSN)*; X.P0016-200; (to be published as 3GPP2 X.S0016-3101 Lucent Technologies, Naperville, Illinois; 2004.

International Search Report dated Dec. 19, 2006 (4 pages).

\* cited by examiner

CONTEXT-SENSITIVE MULTIMEDIA MESSAGE SERVICE RESPONSE

FIELD OF INVENTION

The present invention relates to the field of multimedia messaging in telecommunication networks. In particular, to an apparatus and a method for context-sensitive multimedia message service response.

BACKGROUND

European Telecommunications Standard Institute (ETSI) 3rd Generation Partnership Project (3GPP) Technical Specification 23.140 entitled "Digital cellular telecommunications system (Phase 2+); Universal Mobile Telecommunications System (UMTS); Multimedia Messaging Service (MMS); Functional description; Stage 2" (a.k.a. ETSI TS 123 140 V6.10.0 (2005-06) and 3GPP TS 23.140 version 6.10.0 Release 6) and 3rd Generation Partnership Project Two (3GPP2) Technical Specification X.P0016-200, "Multimedia Messaging Service; Stage 2 Functional Description" define a non-realtime Multimedia Messaging Service (MMS) which has been widely adopted by network operators (both GSM and CDMA), service providers, and terminal, switch and database manufacturers. The 3GPP2 specification is an adaptation of the 3GPP TS 23.140 technical specification.

Figure 1:
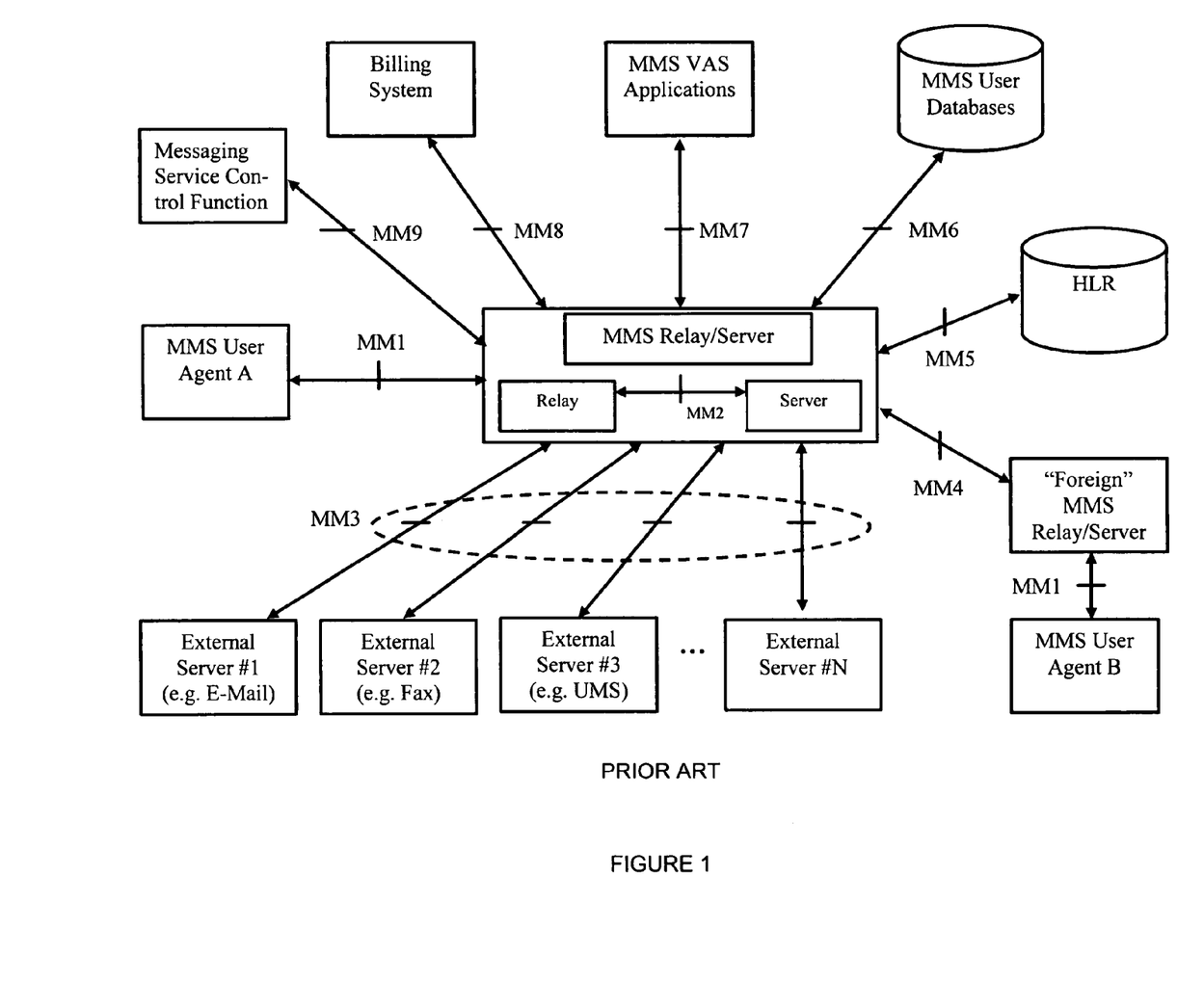
FIG. 1 is a schematic representation of a MMS Reference Architecture used in the 3GPP TS 23.140 technical specification.
Figure 2:
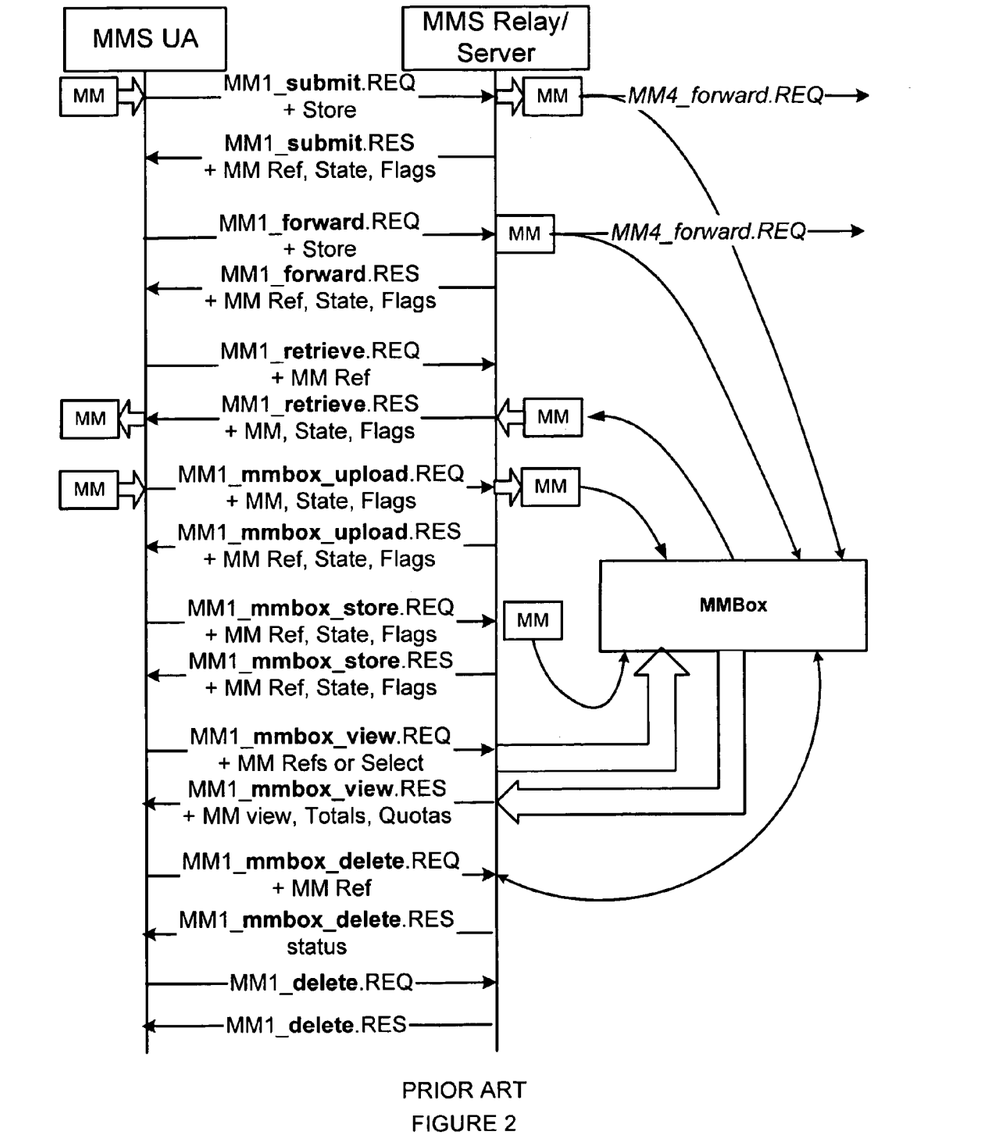
FIG. 2 is a message sequence diagram illustrating exemplary MM1 messages in accordance with the 3GPP TS 23.140 technical specification.

FIG. 1 is a schematic representation of a MMS Reference Architecture used in the 3GPP TS 23.140 technical specification. MM1 is a reference point between a MMS User Agent and a MMS Relay/Server. Reference point MM1 is used to submit Multimedia Messages (MMs) from the MMS User Agent to the MMS Relay/Server, to let the MMS User Agent pull MMs from the MMS Relay/Server, to let the MMS Relay/Server push information about MMs to the MMS User Agent as part of an MM notification, and to exchange delivery reports between MMS Relay/Server and MMS User Agents. Reference point MM1 defines the transactions between the MMS User Agent and the MMS Relay/Server. These transactions include notifications of new MMs, retrieval of MMs, forwarding of MMs, and delivery and read-reply reporting. FIG. 2 is a message sequence diagram illustrating exemplary MM1 messages for some of these transactions.

For example, an originator MMS User Agent (UA) submits a terminal-originated MM to an originator MMS Relay/Server using a MM1_submit.REQ MM1 message, which contains MMS control information and the MM content. If a Store information element is present, the MM will also be copied to a MMBox, if the MMBox is supported and enabled for a corresponding subscriber. The MMS Relay/Server responds with an MM1_submit.RES MM1 message, which provides the status of the request. The MM1_submit.RES message unambiguously refers to the corresponding MM1_submit.REQ message. Support for MM1_submit.REQ is optional for the MMS UA, support for MM1_submit.RES is mandatory for the MMS Relay/Server.

Table 1 describes information elements that can be included in a MM1_submit.RES message in accordance with 3GPP TS 23.140.

TABLE 1

| Information element | Presence | Description |
| --- | --- | --- |
| Message Type | Mandatory | Identifies this message as MM1_submit.RES. |
| Transaction ID | Mandatory | The identification of the MM1_submit.REQ/MM1_submit.RES pair. |
| MMS Version | Mandatory | Identifies the version of the interface supported by the MMS Relay/Server. |
| Request Status | Mandatory | The status of the MM submit request. |
| Request Status Text | Optional | Description which qualifies the status of the MM submit request. |
| Message ID | Conditional | The identification of the MM if it is accepted by the originator MMS Relay/Server. |
| Store Status | Conditional | If the Store request was present in MM1_submit.REQ, the status of the store request. |
| Store Status Text | Optional | The explanatory text corresponding to the Store Status, if present. |
| Stored Message Reference | Conditional | If the Store request was present in MM1_submit.REQ, the message reference to the newly stored MM. |

The originator MMS Relay/Server indicates the status of the MM1_submit.REQ in the associated MM1_submit.RES. A reason code given in a Request Status information element of the MM1_submit.RES can be supported with an explanatory text further qualifying the status in an optional Request Status Text information element. If an explanatory text is available in the Request Status Text information element the MMS User Agent should bring it to the user's attention, for example, in the form of a dialogue box (or window) on the display of a terminal hosting the MMS User Agent.

In a typical network operator/service provider implementation the Request Status Text information element is populated with a predetermined fixed message as a function of the Request Status. For example, in the case of a Request Status indicating a successful MM1_submit.REQ the Request Status Text can be set to "Message sent successfully." The provision of predetermined fixed messages in the Request Status Text as a function of the Request Status represents an incremental operating cost for the network operator/service provider necessitated by compliance with the 3GPP TS 23.140 technical specification.

SUMMARY

An apparatus and a method for context-sensitive multimedia message service (MMS) response. The provision of a response to a MMS UA originated MMS message (e.g. requesting to send a multimedia message (MM)) that is context-sensitive allows the network operator/service provider to provide value-added and potentially revenue generating content in the response. The content of the response can be context-sensitive based on one or more context parameters. The context parameters can, for example, be derived from: the type of message sent, the sender of the MM, the intended receiver of the MM, keywords in the MM (e.g. in the subject line and message body), the message content-type of the MM, and combinations thereof. The context parameters can be based on, but are not limited to, any of the information elements in the MMS UA originated MMS message, fields in an associated MM, inputs provided by other external systems (e.g. accounting, presence and location information) and combinations thereof.

The context-sensitive response can contain one or more fixed reply messages, reply message templates completed with response information, reply messages received from an external system and combinations thereof. The response information used to complete the reply message templates can be derived from information in MMS UA originated MMS message, information in an associated MM, external sources of additional information and combinations thereof.

In accordance with an exemplary embodiment, there is provided an apparatus for providing a context-sensitive response to a user agent originated multimedia service message, the apparatus comprising: a multimedia service message handler adapted to receiving the user agent originated multimedia service message and sending the context-sensitive response; a reply store having a plurality of reply messages; and a logic engine adapted to: determining a context based on one or more context parameters derived from the user agent originated multimedia service message; selecting, based on the context, one or more reply messages from the plurality of reply messages and includes the selected reply messages in the context-sensitive response; and providing for the context-sensitive response to be sent to the user agent by the multimedia message service relay.

In accordance with another exemplary embodiment, there is provided a method for providing a context-sensitive response to a user agent originated multimedia message, the method comprising the steps of: receiving the user agent originated multimedia message; determining a context based on one or more context parameters, the context parameters being derived from the user agent originated multimedia message; selecting one or more reply messages from a plurality of reply messages based on the context; including the selected reply messages in the context-sensitive response; and sending the context-sensitive response to the user agent.

Other aspects and features of the present invention will become apparent to those ordinarily skilled in the art or science to which it pertains upon review of the following description of specific embodiments of the invention in conjunction with the accompanying figures.

BRIEF DESCRIPTION OF DRAWINGS

The present invention will be described in conjunction with drawings in which.

DETAILED DESCRIPTION

Figure 3:
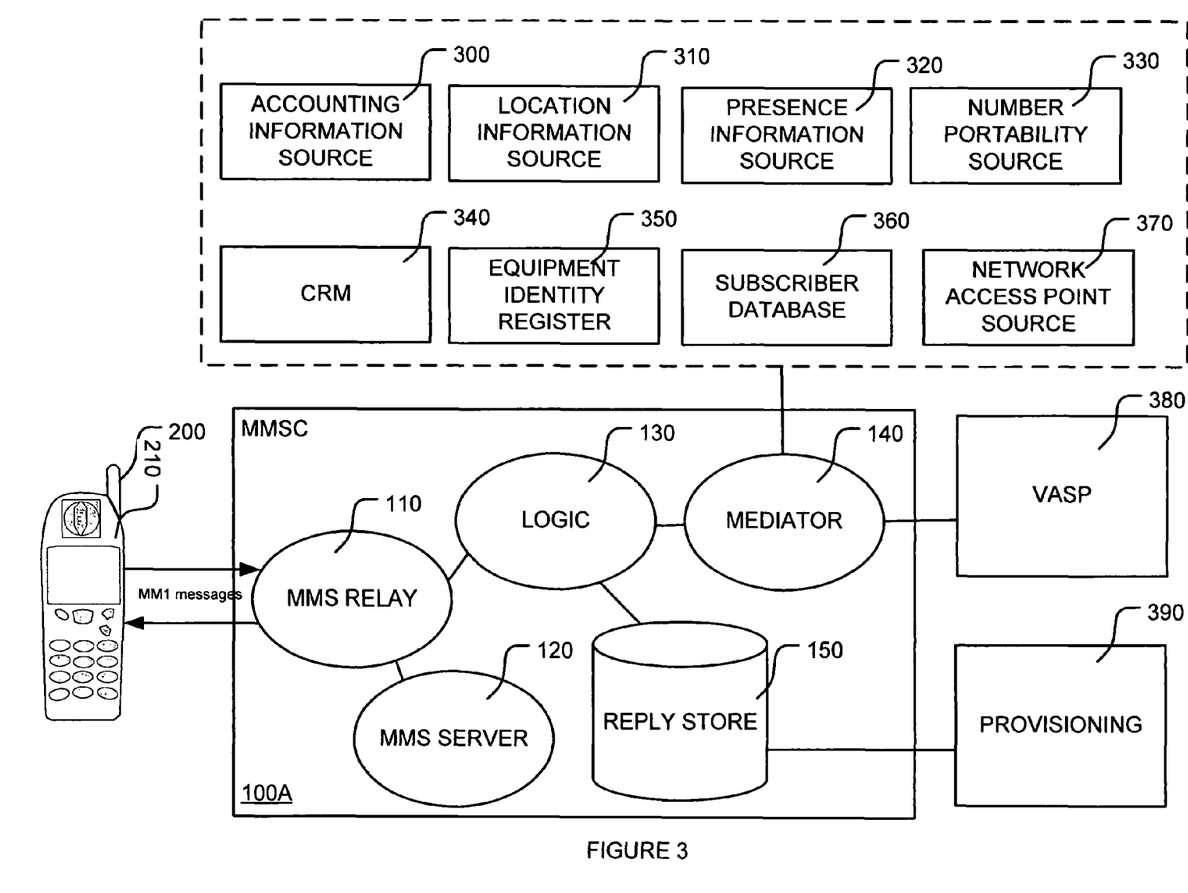
FIG. 3 is a schematic representation of an exemplary embodiment of an apparatus for providing a context-sensitive multimedia message service (MMS) response to a MMS UA originated MMS message.

FIG. 3 is a schematic representation of an exemplary embodiment of an apparatus 100A for providing a context-sensitive multimedia message service (MMS) response to a UA originated MMS message in an exemplary environment in which it can be used. The apparatus 100A is a multimedia message service center (MMSC). The apparatus 100A comprises a MMS Relay 110, a MMS Server 120, a logic engine 130, a mediator 140 and a reply store 150. The apparatus 100A provides the functionality required for a MMS Relay/Server in accordance with the 3GPP TS 23.140 MMS Reference Architecture (see FIG. 1). The MMS Relay 110 provides for sending to and receiving from a MMS user agent (UA) 210 messages in accordance with the MM1 reference point of the 3GPP TS 23.140 technical specification. The MMS UA 210 can be hosted in, for example, a mobile phone 200.

The operation of the apparatus 100A will now be described using an exemplary scenario in which a UA originated MMS message is a request to send a MM and the context-sensitive response is provided in a corresponding response message. A MM1_submit.REQ message from the MMS UA 210, together with a MM to be sent, is received by the MMS Relay 110 when the MMS UA 210 submits a request to send the MM. The MMS Relay 110 sends a MM1_submit.RES message to the MMS UA 210 in response to the MM1_submit.REQ message.

Table 2 describes information elements that can be included in a MM1_submit.REQ message in accordance with 3GPP TS 23.140.

TABLE 2

| Information element | Presence | Description |
| --- | --- | --- |
| Message Type | Mandatory | Identifies this message as MM1_submit.REQ |
| Transaction ID | Mandatory | The identification of the MM1_submit.REQ/MM1_submit.RES pair. |
| MMS Version | Mandatory | Identifies the version of the interface supported by the MMS UA. |
| Recipient address | Mandatory | The address of the recipient(s) of the MM. Multiple addresses are possible. |
| Content type | Mandatory | The content type of the MM's content. |
| Sender address | Optional | The address of the MM originator. |
| Message class | Optional | The class of the MM (e.g., personal, advertisement, information service) |
| Date and time | Optional | The time and date of the submission of the MM (time stamp). |
| Time of Expiry | Optional | The desired time of expiry for the MM or reply-MM (time stamp). |
| Earliest delivery time | Optional | The earliest desired time of delivery of the MM to the recipient (time stamp). |
| Delivery report | Optional | A request for delivery report. |
| Reply-Charging | Optional | A request for reply-charging. |
| Reply-Deadline | Optional | In case of reply-charging the latest time of submission of replies granted to the recipient(s) (time stamp). |
| Reply-Charging-Size | Optional | In case of reply-charging the maximum size for reply-MM(s) granted to the recipient(s). |
| Priority | Optional | The priority (importance) of the message. |
| Sender visibility | Optional | A request to show or hide the sender's identity when the message is delivered to the recipient. |
| Store | Optional | A request to store a copy of the MM into the user's MMBox, in addition to the normal delivery of the MM. |
| MM State | Optional | The value to set in the MM State information element of the stored MM, if Store is present. |
| MM Flags | Optional | One or more MM Flag keywords to set in the MM Flags information element of the stored MM, if Store is present |
| Read reply | Optional | A request for read reply report. |
| Subject | Optional | The title of the whole multimedia message. |
| Reply-Charging-ID | Optional | In case of reply-charging when the reply-MM is submitted within the MM1_submit.REQ this is the identification of the original MM that is replied to. |
| Applic-ID | Optional | Identification of the destination application. |
| Reply-Applic-ID | Optional | Identification of an application to which reply-MMs, delivery reports and read-reply reports are addressed. |
| Aux-Applic-Info | Optional | Auxiliary application addressing information. |
| Content Class | Optional | Classifies the content of the MM to the smallest content class to which the MM belongs [85]. |

TABLE 2-continued

| Information element | Presence | Description |
| --- | --- | --- |
| DRM Content | Optional | Indicates if the MM contains DRM-protected content |
| Adaptations | Optional | Indicates if the originator allows adaptation of the content (default True) |
| Content | Optional | The content of the multimedia message |

The MMS Relay 110 provides the MM1_submit.REQ message and the associated MM to the logic engine 130 for processing. The logic engine 130 provides for the forwarding of the MM to an intended recipient of the MM in accordance with 3GPP TS 23.140. The logic engine 130 also provides for the preparation of the MM1_submit.RES message in response to the MM1_submit.REQ message. Preparation of the MM1_submit.RES message includes population of the information elements in the message (see Table 1).

The content of the Request Status information element indicates if the MM submit request was successful or failed. The Request Status Text information element can optionally be populated with a fixed message that is a function of the content of the Request Status information element. The logic engine 130 can also populate the Request Status Text information element as a function of a context determined from one or more context parameters. 3GPP TS 23.140 does not specify a length limit for the Request Status Text information element; however the length may be limited in some implementations.

The context parameters can be based on, but are not limited to, any of the information elements in the MMS request message, on fields in the MM, inputs provided by external systems (e.g. accounting, presence and location information) and combinations thereof.

Context parameters can be used to establish a sender context that is based on the originator of the MM. A sender context parameter can, for example, be based on the Sender Address information element in the MM1_submit.REQ message, on a sender address field in the MM or a sender address resolved by querying another network element (e.g. an AAA (Athentication, Authorization and Accounting) Server or a MSCF (Messaging Service Control Function)).

A recipient context can be established based on the intended recipient, or alternatively intended recipients, of the MM. A recipient context parameter can, for example, be based on the Recipient Address information element in the MM1_submit.REQ message or on information obtained by querying another network element (e.g. a Number Portability Source 330).

A message content-type context can be established based on the message content-type of the MM. A message content-type context parameter can, for example, be based on the Content Type information element in the MM1_submit.REQ message or on one or more content type fields in the MM.

The message content-type context parameter can identify the MM content as, for example, containing text, audio, still image, video and graphical presentation data.

The message content-type context parameter can also be derived from the encoding scheme used to generate the content.

The context parameters can be based on, but are not limited to, any of the information elements in the MM1_submit.REQ message (see Table 2), on fields in the MM and combinations thereof.

The sender context, the recipient context, the message content-type context, the keyword context and any of the context parameters described above can be combined to form a context used in populating the Request Status Text information element. The Request Status Text information element can contain one or more reply messages each of which can be generated separately and added (populated) into the information element.

The context parameters based on information elements in the MM1_submit.REQ message and on fields in the MM can be used to derive further context parameters. For example, sender context parameters can be sent to an external system such as an account information source 300, a network access point source 370, a customer relationship management source 340, an equipment information register 350 and a subscriber database 360. These external systems can return sender related information such as account type (e.g. pre-paid or monthly invoice), account status and account balance (e.g. number of pre-paid messages remaining), network type, registered credit card expiry date and equipment type that can be used to derive further context parameters. Interaction with the external system is via the mediator 140.

Similarly recipient context parameters can be sent to external systems such as, for example, an account information source 300, a location information source 310, a presence information source 320, a number portability source 330 (e.g. ENUM (Internet Engineering Task Force (IETF) RFC2916) and WNP (Wireless Number Portability)), a customer relationship management (CRM) source 340, an equipment information register (EIR) 350, a subscriber database 360 and a network access point source 370. These systems can return information such as, for example, recipient account information, recipient preference, recipient network presence (i.e. availability) status, recipient network location information, number portability resolution information, CRM information, platform capability (e.g. multimedia player capability) for the recipient's MMS UA 210, subscriber language preference and what type (e.g. 2 G.2.5 G or 3 G) of network the MMS UA 210 is tethered to. The returned information can be used to derive further context parameters.

The logic engine 130 can use any of the context parameters, including combinations thereof, in selecting the content to be placed in the Request Status Text information element of the MM1_submit.RES message. The content of the Request Status Text information element can include a fixed message selected from a plurality of fixed reply messages in the reply store 150. The plurality of reply messages in the reply store 150 can be administered, created, modified and deleted via a provisioning system 390. The fixed reply messages in the reply store 150 can be arranged (e.g. indexed) by, for example, MM recipient address, MM sender address, MM message content-type or keyword context.

Content of the Request Status Text information element can also be based on message templates to which content data is added. For example, if the MM sender has a pre-paid account, the message template can, for example, be: "You have XX message-sends remaining on account." Where 'XX' is replaced by an actual number of message-sends remaining on account. The number of remaining message-sends can be obtained, for example, from the account information source 300. The returned information can be used directly as, or be used to derive, content data that is added to a message template to form a message that is added to the Request Status Text information element. A plurality of message templates can be stored in the reply store 150. The message templates can be administered, created, modified and deleted via the provisioning system 390.

Each of the external information sources can, as an alternative to providing returned information from which content data is derived, return complete reply messages that can be added to the Request Status Text information element.

In accordance with 3GPP TS 23.140 the apparatus 100A can, in some circumstances, make interventions that change the MM content such as, for example, in the presence of network congestion the apparatus 100A can override the MM 'Time of Expiry' field set (or defaulted to) by the sender (e.g. the MMS UA 210). The overriding of MM content results in an exemplary context in which the apparatus 100A can add to the Request Status Text information element a reply message indicating to the sender that a content element (e.g. 'Time of Expiry') of the MM has been overridden.

The apparatus 100A can interact with a value added service provider (VASP) 380 by forwarding an MM to the VASP 380 and by receiving a response to the MM from the VASP 380. The response from the VASP 380 can include returned information to be used in completing a template message, a complete reply message and combinations thereof (similarly to as described above with respect to external information sources). The completed template message and the complete reply message can be added to the Request Status Text information element. The apparatus 100A can interact with one or more VASP 380 via the mediator 140.

The reply messages as described above that are added to the Request Status Text information element of the MM1_submit.RES message can be in the form of text messages. In an alternative embodiment, the reply messages can be multimedia messages including, for example, text, audio, still image, video, graphical presentation and combinations thereof content. The MMS UA 210 can be adapted to present the multimedia reply messages. Both text and multimedia reply messages can be included in the Request Status Text information element of the MM1_submit.RES message.

In an alternative embodiment the apparatus 100A can process the context-sensitive MMS response to remove duplicate reply messages and to resolve conflicting reply messages before the response is sent to the MMS UA 210.

The apparatus 100A has been described above with regard to providing a context-sensitive MMS response to a MM submit request (i.e. MM1_submit).

The apparatus 100A is not limited to providing a response to a MMS submit request, it can also provide a contest-sensitive MMS response to other MMS UA 210 originated MMS messages. The MMS UA 210 originated MS messages can include other 3GPP TS 23.140 technical specification defined messages such as, for example, MM1_forward, MM1_mmbox_store, MM1_mmbox_view, MM1_mmbox_upload, MM1_mmbox_delete and MM1_delete. For each MMS UA 210 originated MMS message (e.g. messages having names ending in '.REQ', see FIG. 2), the apparatus 100A can provide a context-sensitive MMS response contained in a corresponding response message (e.g. messages having names ending in '.RES', see FIG. 2) in a manner analogues to that described above for the MMS submit request (i.e. MM1_submit.REQ). The apparatus 100A receives a MMS US 210 originated MMS message from which it can derive (directly and in conjunction with one or more external systems) one or more context parameters. The context parameters are used to determine a context. A context-sensitive response can be populated with one or more reply messages selected as a function of the context. The context-sensitive response can be contained in, for example, the Request Status Text information element for messages supporting that information element or in the Store Status Text information element in the case of the MM_mbox_store message. The one or more reply messages can comprise fixed reply messages, rely message templates completed with response information, reply messages received from external systems and combinations thereof. The apparatus 100A sends the populated context-sensitive response to the MMS UA 210.

Figure 5:
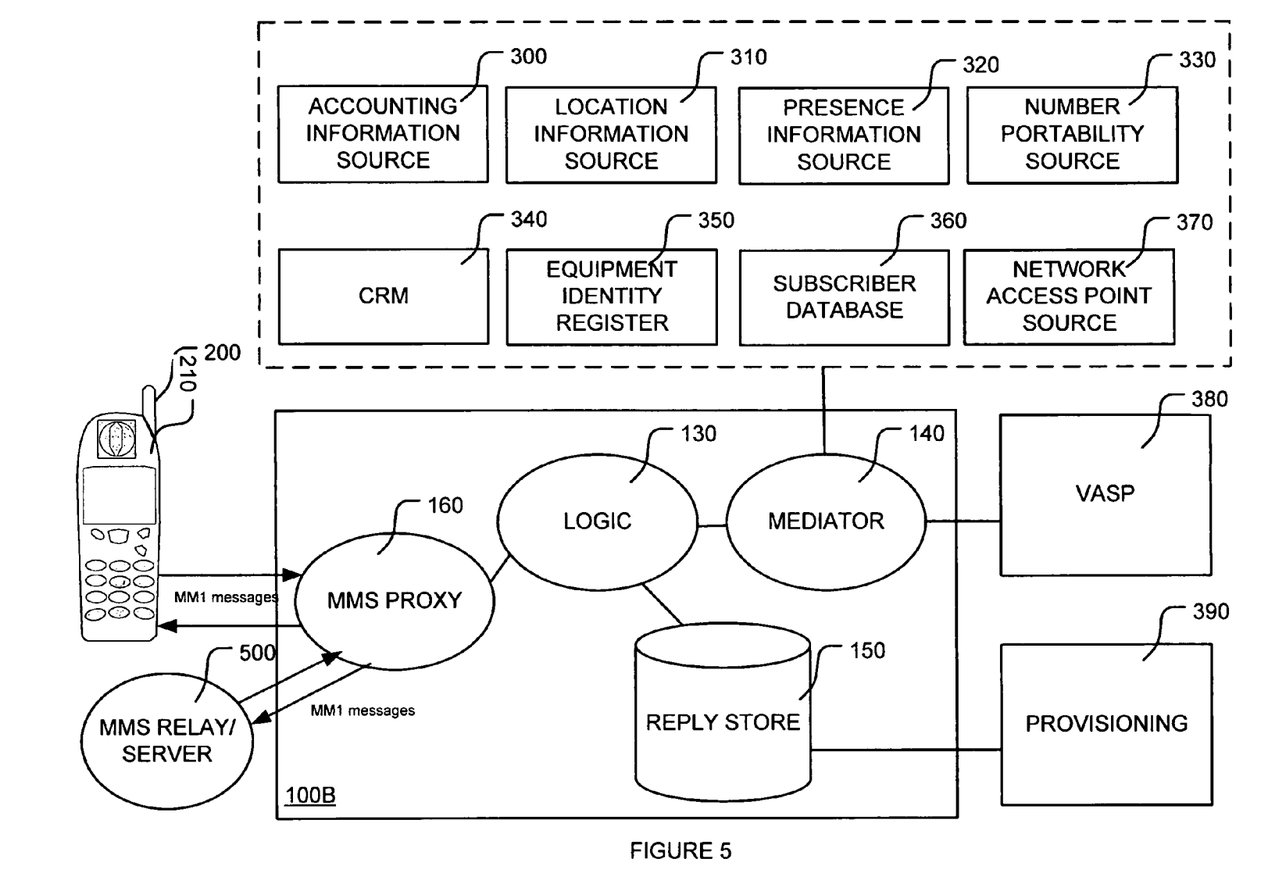
FIG. 5 is a schematic representation of an alternative exemplary embodiment of an apparatus for providing a context-sensitive MMS response to a MMS UA originated MMS message.

FIG. 5 is a schematic representation of an alternative exemplary embodiment of an apparatus 100B for providing a context-sensitive multimedia message service response to a MMS UA 210 originated message. In this embodiment the apparatus 100B is similar to the apparatus 100A as described above with reference to FIG. 3 but does not comprise a MMS relay 110 or a MMS server 120 and therefore does not provide the functionality required for a MMS Relay/Server in accordance with the 3GPP TS 23.140 MMS Reference Architecture (see FIG. 1). The apparatus 100B further comprises a MM1 Proxy 160 that can receive from and send to the MMS UA 210 MM1 messages. The MM1 Proxy 160 can also send to and receive from a MMS Relay/Server 500 MM1 messages. The MMS Relay/Server 500 is external to the apparatus 100B. The MM1 Proxy provides for the bi-directional forwarding of MM1 messages between the MMS UA 210 and the MMS Relay/Server 500.

Figure 4:
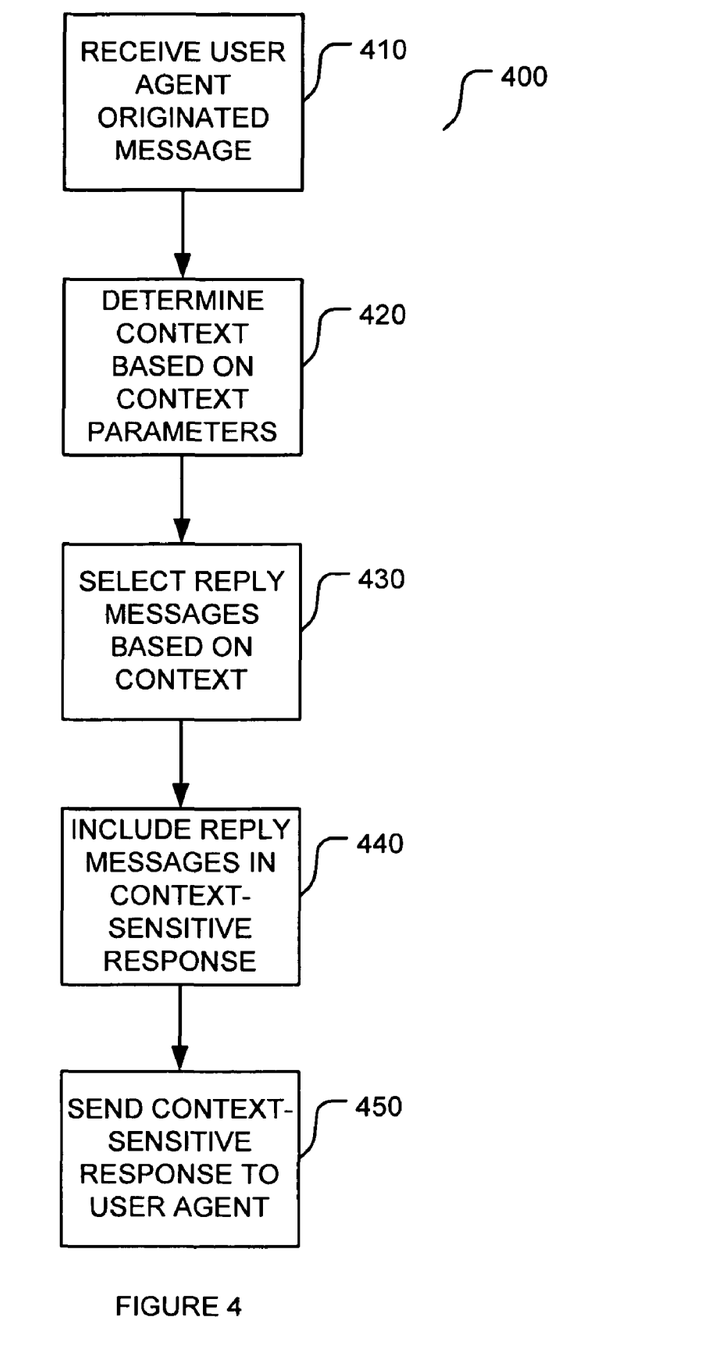
FIG. 4 is a flowchart of steps in an exemplary method for providing a context-sensitive multimedia service response.

FIG. 4 is a flowchart of steps in an exemplary method 400 for providing a context-sensitive multimedia service response. The steps of the method 400 will be described with reference to providing a context-sensitive multimedia message response to a request to send a MM. In an alternative embodiment, the method 100A comprises analogues steps when the response is to a MMS UA 210 originated MMS message other than a request to send an MM. The steps of exemplary method 400 are as follows. A MMS US 210 originated MMS message is received (step 410). The request can be, for example, a MM1_submit.REQ message sent by a MMS UA 210 in accordance with the 3GPP TS 23.140 technical specification. A context is determined based on one or more context parameters (step 420). The context parameters can be based on, but are not limited to, any of the information elements in the MM1_submit.REQ message, on fields in an associated MM, inputs provided by external systems and combinations thereof in a manner similar to as described above with reference to the apparatus 100A and FIG. 3. The context parameters can, for example, relate to the sender of the MM, the intended receiver of the MM, keywords in the MM, the message content-type of the MM, and combinations thereof. One or more reply messages are selected as a function of the context determined from the context parameters (step 430). The context-sensitive response can contain one or more fixed reply messages, reply message templates completed with response information, reply messages received from an external system and combinations thereof. The response information used to complete the reply message templates can be derived from information in the MM and in the MMS request message by the apparatus alone or in combination with external sources of additional information. The reply messages are included in the context-sensitive response (step 440). The context-sensitive response can be processed to remove duplicate reply messages and to resolve conflicting reply messages. The context-sensitive response is sent to the MMS UA 210 (step 450). The context-sensitive response can be in the form of content in a Request Status Text information element in a MM1_submit.RES message sent to the MMS UA 210 in accordance with the 3GPP TS 23.140 technical specification.

In providing a context-sensitive MMS response to a MMS UA 210 originated MMS message, the apparatus 100A allows the network operator/service provider to provide value-added and potentially revenue generating content in the response. For example, using sender context subscriber account information a pre-paid alert such as "Only $1 left in your account, please top up" can be included in the reply message. Other examples include: sponsored messaging, "This message submission is free, sponsored by Popular Consumer Products Co."; targeted advertising, "Book your vacation with Wily Travel now and save"; recipient alert message, "I'm on vacation and won't be reading my MMs for the next two weeks"; application voting receipt, "Unreal TV thanks you for your vote".

It will be apparent to one skilled in the art that numerous modifications and departures from the specific embodiments described herein may be made without departing from the spirit and scope of the present invention.

What is claimed:

1. An apparatus for providing value added content, the apparatus comprising:
    a multimedia service message handler adapted:
       to receive multimedia content from a user agent in a user agent originated multimedia service message and to forward the content to at least one recipient;
       to send, in response to the user agent originated multimedia service message, a multimedia message status response to the user agent, wherein the multimedia message status response is a network protocol message which comprises information about the status of the user agent originated multimedia service message;
    a reply store having a plurality of reply messages; and
    a logic engine adapted:
       to determine a context based on one or more context parameters derived from the information elements of the user agent originated multimedia service message;
       to select, based on the context, one or more reply messages from the plurality of reply messages;
       to include the selected one or more reply messages in the context-sensitive multimedia message status response, to obtain a context-sensitive multimedia message status response that comprises value-added content related to the one or more context parameters; and,
       to provide the context-sensitive multimedia message status response to the multimedia service message handler, for sending the multimedia status response message to the user agent.

2. The apparatus of claim 1, wherein the one or more context parameters can be derived from one or more information elements in the user agent originated multimedia service message.

3. The apparatus of claim 1, wherein the plurality of reply messages comprises a plurality of fixed reply messages.

4. The apparatus of claim 1, wherein the plurality of reply messages comprises a plurality of template reply messages, content data derived from the one or more context parameters can be added to each template reply message to complete a reply message.

5. The apparatus of claim 1, the logic engine further processes the context-sensitive multimedia message status response to remove duplicate reply messages and to resolve conflicting reply messages.

6. The apparatus of claim 1, further comprising:
    a mediation module interfacing with one or more external systems that provide one or more inputs.

7. The apparatus of claim 6, wherein the one or more inputs can be used to derive one or more context parameters and the context determined by the logic element is further based on the one or more context parameters derived from the one or more inputs.

8. The apparatus of claim 6, wherein the one or more inputs can include an externally-provided reply message and the logic engine can include the externally-provided reply message in the context-sensitive multimedia message status response.

9. The apparatus of claim 1, wherein the user agent originated multimedia service message is a request to send a multimedia message.

10. The apparatus of claim 9 wherein each of the one or more context parameter can be based on any of:
    a sender of the multimedia message;
    an intended receiver of the multimedia message;
    a keyword contained in the multimedia message;
    a message content-type of the multimedia message; and
    any combinations thereof.

11. The apparatus of claim 9, wherein the one or more context parameters can be derived from one or more fields in the multimedia message.

12. The apparatus of claim 1, wherein the user agent originated multimedia service message is any one of the messages:
    MM1_submit.REQ;
    MM1_forward.REQ;
    MM1_mmbox_store.REQ;
    MM1_mmbox_view.REQ;
    MM1_mmbox_upload.REQ;
    MM1_mmbox_delete.REQ; and
    MM1_delete.REQ;
    in accordance with the 3GPP TS 23.140 technical specification.

13. A method for providing value added content, the method comprising:
    receiving multimedia content in a user agent originated multimedia service message and forwarding the content to at least one recipient;
    in response to the user agent multimedia message:
    determining a context based on one or more context parameters, the context parameters being derived from information elements of the user agent originated multimedia message;
    selecting one or more reply messages from a plurality of reply messages based on the context;
    including the one or more selected reply messages in a multimedia message status response, to obtain a context-sensitive multimedia message status response that comprises value-added content related to the one or more context parameters, wherein the multimedia message status response message is a network protocol message, which comprises information about the status of the user agent originated multimedia service message; and,
    sending the context-sensitive multimedia message status response to the user agent.

14. The method of claim 13, wherein the one or more context parameter can be derived from one or more information elements in the user agent originated multimedia message.

15. The method of claim 13, wherein the plurality of reply messages comprises a plurality of fixed reply messages.

16. The method of claim 13, wherein the plurality of reply messages comprises a plurality of template reply messages, content data derived from the one or more context parameters can be added to each template reply message to complete a reply message.

17. The method of claim 13, further comprising the step of:
    processing the context-sensitive multimedia message status response to remove duplicate reply messages and to resolve conflicting reply messages.

18. The method of claim 13, further comprising the step of:
    receiving, from one or more external systems, one or more inputs.

19. The method of claim 18, further comprising the step of:
deriving one or more context parameters from the one or more inputs; and
wherein the step of determining a context is further based on the one or more context parameters derived from the one or more inputs.

20. The method of claim 18, wherein the one or more inputs can include an externally-provided reply message and the step of including can further include the externally-provided reply message in the context-sensitive multimedia message status response.

21. The method of claim 13, wherein the user agent originated message is a request to send a multimedia message.

22. The method of claim 21, wherein each of the one or more context parameter can be based on any of:
a sender of the multimedia message;
an intended receiver of the multimedia message;
a keyword contained in the multimedia message;
a message content-type of the multimedia message; and
any combinations thereof.

23. The method of claim 21, wherein each context parameter can be derived from one or more fields in the multimedia message.

24. The method of claim 13, wherein the user agent originated multimedia service message is any one of the messages:
MM1_submit.REQ;
MM1_forward.REQ;
MM1_mmbox_store.REQ;
MM1_mmbox_view.REQ;
MM1_mmbox_upload.REQ;
MM1_mmbox_delete.REQ; and
MM1_delete.REQ;
in accordance with the 3GPP TS 23.140 technical specification.

* * * * *